Nov. 11, 1969     D. B. COLYER ETAL     3,477,504

POROUS METAL AND PLASTIC HEAT EXCHANGER

Filed May 29, 1967     3 Sheets-Sheet 1

Inventors:
Duard B. Colyer,
Robert B. Fleming
by [signature] Mitchell
Their Attorney.

Nov. 11, 1969  D. B. COLYER ETAL  3,477,504
POROUS METAL AND PLASTIC HEAT EXCHANGER
Filed May 29, 1967  3 Sheets-Sheet 2

Inventors:
Duard B. Colyer,
Robert B. Fleming
by  
Their Attorney

Nov. 11, 1969    D. B. COLYER ETAL    3,477,504
POROUS METAL AND PLASTIC HEAT EXCHANGER
Filed May 29, 1967    3 Sheets-Sheet 3

Inventors:
Duard B. Colyer,
Robert B. Fleming,
by
Their Attorney.

– – – – – –

3,477,504
POROUS METAL AND PLASTIC HEAT EXCHANGER
Duard B. Colyer, Schenectady, and Robert B. Fleming, Scotia, N.Y., assignors to General Electric Company, a corporation of New York
Filed May 29, 1967, Ser. No. 641,918
Int. Cl. F28d 7/02
U.S. Cl. 165—164                               6 Claims

ABSTRACT OF THE DISCLOSURE

A heat exchanger made with two or more channels in which fluids pass in counterflow and parallel flow through a plurality of plates made of porous heat conductive material. Alternate layers of conductive plates and non-conductive separators or gaskets are bonded together to form channels through which the fluids pass without mixing together. The fluids flow down the axis of the exchanger while heat transfer is effected laterally across the flow path.

---

Our invention relates to heat exchangers and particularly to cryogenic heat exchangers made of parallel porous plates.

Heat exchangers prior to this time have been made of small tubes surrounded by a jacket having a fluid medium on the inside of the tube and another on the outside with heat being passed through the tube from one medium to the other. This type of heat exchanger is open to a variety of objections such as longitudinal heat flow down the walls of the tubes, small heat transfer surface area per unit volume, and a buildup of laminar flow within and without the tube whereby only fringe elements of the flow are cooled or heated and the coefficient of heat transfer is low. In addition, the flow may distribute itself nonuniformly about the tubes resulting in poor thermal performance.

The principal object of the present invention is to provide a heat exchanger which is compact and has high heat transfer efficiency.

Another object of the present invention is to provide a heat exchanger which is easily assembled.

Briefly, our heat exchanger is made of a series of porous plates having gaskets made of reinforced plastic, such as polyester glass laminate bonded therebetween so as to form different cross-sectional areas between the porous plates in order that gas or other fluid may be passed in counterflow or parallel relationship through the series of porous plates and gaskets.

Figure 1:
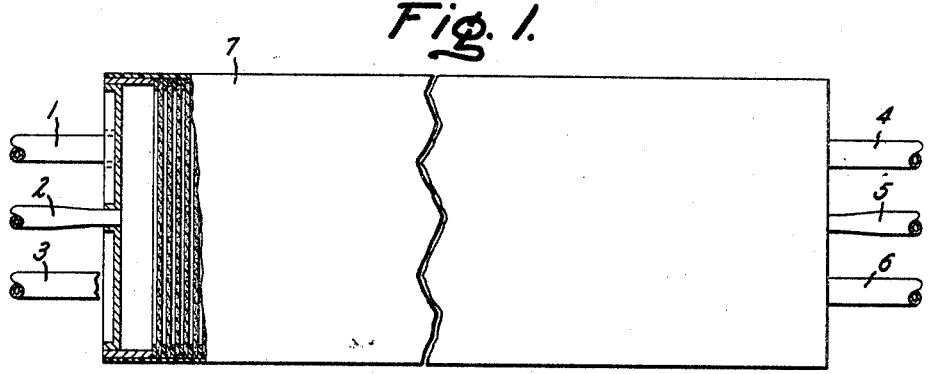
FIGURE 1 shows a plan view of an embodiment of our invention.

FIGURE 1 shows the overall view of an embodiment of our heat exchanger. In this embodiment there are three conduits 1–6 at each end of the exchanger and fluids are passed into one or more of the conduits at one end and out the other end. The body of the heat exchanger may be covered by jacket 7 of a non-conductive material, such as an organic plastic, to eliminate leakage and act as a shield about the inner parts of the heat exchanger.

Figure 2:
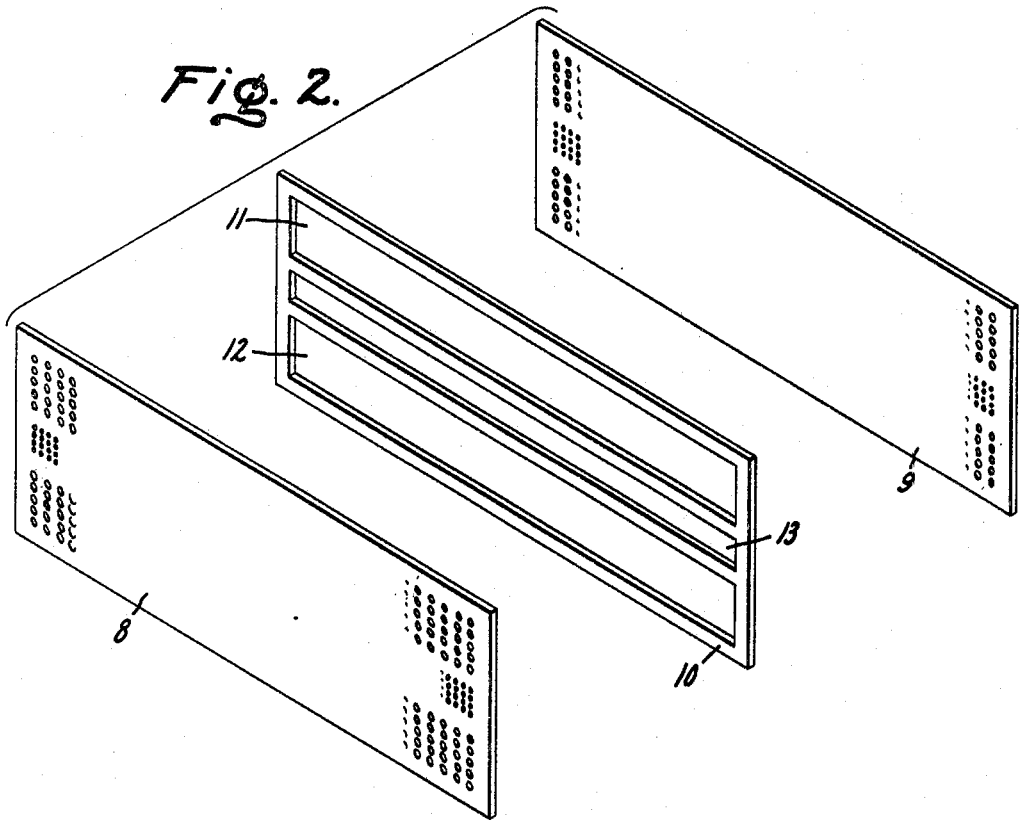
FIGURE 2 shows an exploded view of the embodiment of FIGURE 1.
Figure 3:
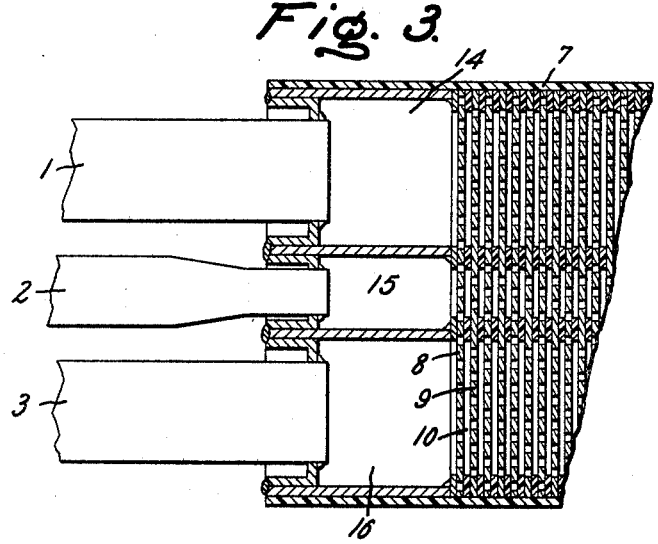
FIGURE 3 shows a cross-section of one end of the embodiment of FIGURE 1 cut away to show the three channels formed.

In FIGURE 2 the exploded view of this embodiment of our heat exchanger shows two plates 8, 9 and a plastic non-porous separator 10 which may be epoxy or polyethylene, for example. The plates are made of porous material of high thermal conductivity to allow fluids to be passed through and facilitate transmission of heat from the fluid to the porous plate. The porous plates may be made of aluminum, copper or any other highly conductive material. Aluminum is favored because of its light weight while copper, being sinterable may be favored for its advantage in fabrication. The porosity of these plates may be obtained in a number of ways, for example, the plates may consist of sintered metal spheres, or sintered layers of wire screen, or sintered randomly oriented small metal pieces. Alternatively, the plates may be of metal in which multiple holes are produced by a process such as punching, etching, drilling, etc. These holes may be arranged so that the holes are not aligned from plate to plate so that the flow must weave back and forth between plates. Between these plates is a reinforced non-conductive separator 10 of organic plastic which has large openings to accommodate the currents of flow desired in the particular cryogenic heat exchanger. As shown here, these parts when assembled have three layers or channels, two large channels 11, 12 and one small channel 13 between the two large ones. The large channels accommodate low pressure flow while the small one accommodates high pressure flow. Any number of channels may be used. These layers are seen in FIGURE 3 where tubes 1, 2, 3 are attached at the header ends for ingress or egress of pressure flow from the heat exchangers. As shown here the high pressure may be hot and passed into the heat exchanger through the center tube 2 while low pressure above and below operates in counterflow relation to receive the conducted heat which flows outwardly from the center through the porous plates. Conversely, the low pressure fluid flow may be hot and the cold high pressure fluid flowing in counterflow relationship receives heat conducted therein from the low pressure sides. The porous plates are made of aluminum or some other highly thermally conductive material while the separators are made of an organic plastic material having low thermal conductivity such as polyester or epoxy resin with reinforcing material such as glass fibers embedded therein. The plates and separators or gaskets are bonded to each other by an adhesive such as an epoxy or polyester. These bonding materials are characterized by a similar coefficient of expansion to the material being bonded and retain their adhesive qualities at low temperature. An example of such an adhesive is Epon resin #820 and Epon Curing Agent V–40. The adhesive material will bond together with the plates and separators to form a laminate composed of alternate plates and separators. The cross section of FIGURE 3 shows a series of reinforced plastic separators with aluminum plates mounted between each of the separators. At each end of the heat exchanger shown in this embodiment is a spacer made of aluminum. Compartments 14, 15, 16 are formed in the header and corresponding to the channels formed by the plastic separators and the porous aluminum plates. The header should be made of a material having the same characteristics as the heat transfer plates in the particular heat transfer device. Three tubes 1, 2 and 3 are fastened to the end of each header connecting one tube to each compartment 14, 15 and 16.

Figure 4:
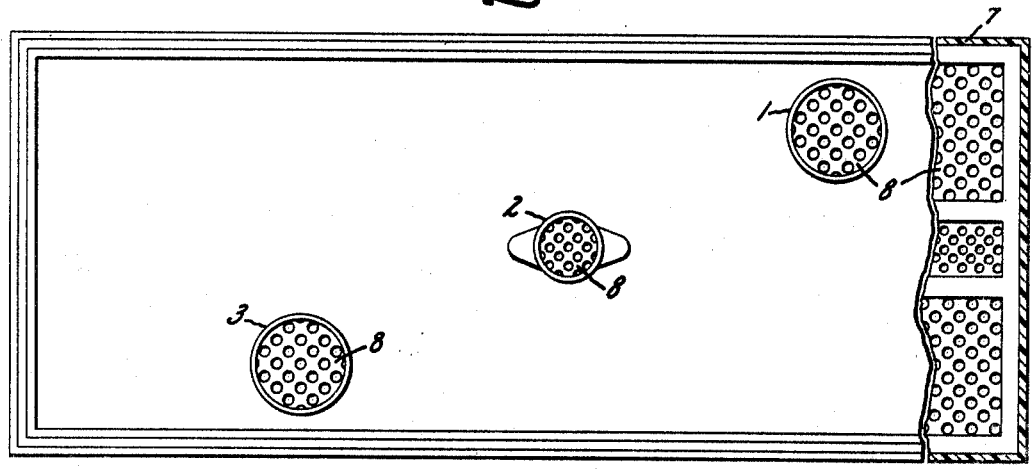
FIGURE 4 shows an end view of a heat exchanger of our invention with a partial section of the end cut away.

The end view of the header of FIGURE 3 shown in FIGURE 4 shows also the pipes and pipe sizes used in this particular embodiment and through the pipes in this view is seen the porous aluminum conductive plate which forms the first layer in this embodiment. A reinforced jacket 7 made of a material of low thermal conductivity such as plastic may be placed about the plates, spacers and adhesive material and serves to prevent heat transfer through the jacket wall and to eliminate leaks to the outside should any of the separators and plates become disengaged from each other. In addition to forming a hermetic seal the jacket imparts structural rigidity to the assembly.

Figure 5:
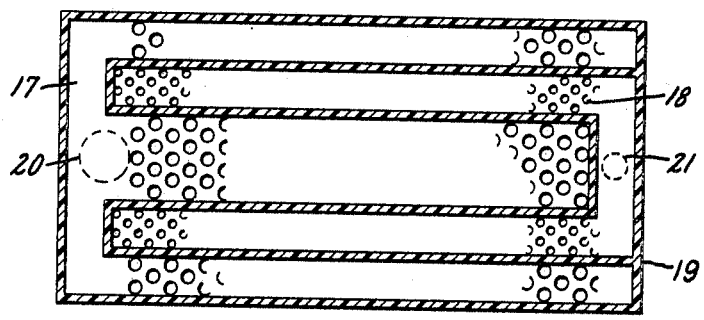
FIGURE 5 shows an alternate embodiment of our heat exchanger.

The embodiment shown in FIGURE 5 is arranged to avoid long thermal distances between streams so that heat in transferring from one stream to another will not have long distances to travel and each interspace between the plates will allow mixing and avoidance of header design problems.

In this embodiment two streams flow one through each of channels 17 and 18 formed by gasket 19. The larger channel 17 is fed through conduit 20 (shown in phantom lines) and a header and the smaller channel 18 is fed through conduit 21 and a header in series. The operation of this embodiment is similar to the operation of the embodiment of FIGURES 1–4. The use of a U-shaped high pressure channel provides a relatively short path for heat conductance between channels 17 and 18.

An advantage of this type of heat exchanger is that there may be a large heat transfer surface per unit of volume because the pores in the plate may be small and numerous and the plastic bonding eliminates the need for compression elements to hold the plates and separators together.

Another and related advantage of this apparatus is that new thermal boundary layers are set up each time the flow enters a plate. Since the thermal boundary layer never becomes very thick a high heat transfer coefficient is maintained during operation of the apparatus.

An advantage of this apparatus is that because of its numerous layers and the mixing of the circulating fluid in the gasket space no special header design is necessary to insure even flow distribution through the apparatus.

Another advantage is that lateral heat conduction is fostered because the conductive plate extends from wall to wall of the heat exchanger while there are alternate bands of insulating plastic down the heat exchanger. In this way, there is a maximum of conduction laterally and a minimum of conduction longitudinally down the heat exchanger. Longitudinal heat conduction is diminished by the use of plastic bonding material between the plates and separators rather than holding plates and separators together by rods or metal framework as in prior apparatus.

This heat exchanger is particularly adapted for operation at cryogenic temperatures because of the low thermal conduction of organic plastic which is used for separators and bonding material, because the specific bonding material used retains its adhesive qualities at very low temperatures as well as normal temperatures and because the traverse of the porous conductive plate across the direction of flow allows maximum heat transfer laterally.

The length of the heat exchanger is governed by the efficiency which one may desire from the heat exchanger and the arrangement and material of its elements.

The foregoing is a description of an illustrative embodiment of the invention, and it is applicant's intention in the appended claims to cover all forms which fall within the scope of the invention.

What we claim as new and desire to secure by Letters Patent of the United States is:

1. A heat exchanger for transferring heat between two counterflowing fluid streams comprising:
   a plurality of high conductivity porous plates,
   a plurality of low conductivity separators, each separator interposed between and in contact with adjacent ones of said plates, each of said separators having an enclosing rim portion and a partition portion extending between and integral with parts of said rim portion, said separators being aligned to provide a pair of channels in which one portion of one channel is interleaved with adjacent portions of the other of said channels,
   means for applying one of said streams to one of said channels and the other of said streams to the other of said channels,
   each of said separators being oblong in outline having a long dimension and a short dimension at right angles thereto in which the long dimensions of said portions of said channels are generally parallel to the long dimensions of said separators and in which the direction of interleaving of one channel with the other of said channels is in the direction of the long dimensions of said separators.

2. The combination of claim 1 in which said porous plates are flat plates with a multiplicity of holes therein and in which the areas of contact of said plates by said separators are substantially devoid of holes, said separators being bonded to adjacent ones of said plates.

3. The combination of claim 1 in which each of said partition portions is folded back on itself several times to form a structure in which a plurality of portions of said one channel are interleaved with adjacent portions of the other of said channels.

4. The combination of claim 1 in which said enclosing rim portion of each of said separators is generally rectangular in outline and in which each of said partition portions is folded back on itself several times to form a structure in which a plurality of portions of said one channel are interleaved with adjacent portions of the other of said channels, each section of said channels between adjacent plates having a side portion connecting the interleaved portions thereof.

5. The combination of claim 4 in which the portions of each of said plates adjacent to each of said side portions of each channel is nonporous.

6. The combination of claim 1 in which the ends of said partition terminate on said rim portion adjacent to one another.

References Cited
UNITED STATES PATENTS

| | | | |
|---|---|---|---|
| 1,734,274 | 11/1929 | Schubart | 165—166 |
| 3,308,879 | 3/1967 | Maddocks | 165—167 |
| 1,863,586 | 6/1932 | Wilke | 165—135 |
| 2,958,935 | 11/1960 | Bloem | 165—10 |
| 3,151,673 | 10/1964 | Strache | 165—155 |
| 3,216,484 | 11/1965 | Gifford | 165—4 |
| 3,228,460 | 1/1966 | Garwin | 165—154 X |
| 3,302,704 | 2/1967 | Valyi | 165—170 |

ROBERT A. O'LEARY, Primary Examiner

THEOPHIL W. STREULE, Assistant Examiner

U.S. Cl. X.R.

165—81